United States Patent
Sato et al.

(10) Patent No.: US 9,908,500 B2
(45) Date of Patent: Mar. 6, 2018

(54) AIRBAG DEVICE

(71) Applicant: HONDA MOTOR CO., LTD., Tokyo (JP)

(72) Inventors: Masahiro Sato, Wako (JP); Kanichi Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/246,032

(22) Filed: Aug. 24, 2016

(65) Prior Publication Data

US 2017/0057454 A1   Mar. 2, 2017

(30) Foreign Application Priority Data

Aug. 27, 2015 (JP) ................... 2015-167762

(51) Int. Cl.
| | |
|---|---|
| *B60R 21/237* | (2006.01) |
| *B60R 21/205* | (2011.01) |
| *B60R 21/264* | (2006.01) |
| *B60R 21/217* | (2011.01) |

(52) U.S. Cl.
CPC .......... *B60R 21/237* (2013.01); *B60R 21/205* (2013.01); *B60R 21/217* (2013.01); *B60R 21/264* (2013.01)

(58) Field of Classification Search
CPC ... B60R 21/237; B60R 21/217; B60R 21/205; B60R 21/264
See application file for complete search history.

(56) References Cited

U.S. PATENT DOCUMENTS

| | | | | |
|---|---|---|---|---|
| 5,884,939 A | * | 3/1999 | Yamaji | B60R 21/205 280/732 |
| 2007/0132215 A1 | * | 6/2007 | Takimoto | B60R 21/206 280/730.1 |
| 2007/0182134 A1 | * | 8/2007 | Mizuno | B60R 21/206 280/730.1 |
| 2009/0045607 A1 | * | 2/2009 | Fukuyama | B60R 21/217 280/728.2 |
| 2017/0080893 A1 | * | 3/2017 | Miura | B60R 21/20 |

FOREIGN PATENT DOCUMENTS

| | | |
|---|---|---|
| JP | 2012-111389 A | 6/2012 |
| WO | 2004/045920 A1 | 6/2004 |
| WO | 2010/150603 A1 | 12/2010 |

* cited by examiner

*Primary Examiner* — Drew J Brown
(74) *Attorney, Agent, or Firm* — Westerman, Hattori, Daniels & Adrian

(57) ABSTRACT

An airbag device 1 includes a retainer 14, a bag body 12, and an inflator 13. The retainer 14 is installed on the inner side of a deployment wall 15 of an instrument panel 11 that is openable by breaking. The retainer 14 has a bottom wall 14B arranged opposite to the deployment wall 15, and a front side wall 14F continuous with the bottom wall 14B. The bag body 12 is folded in a deployable manner, and is held in the retainer 14 in the folded state. The inflator 13 is installed in the front side wall 14F of the retainer 14, and generates gas to be fed into the bag body 12 when impact is inputted. All folded parts of the bag body 12 are arranged on the side closer to the deployment wall 15 than an end part of the inflator 13 on the side of the bottom wall 14B of the retainer 14.

5 Claims, 6 Drawing Sheets

AIRBAG DEVICE

CROSS-REFERENCE OF RELATED APPLICATION

This application claims priority of Japanese Patent Application No. 2015-167762 filed in Japan on Aug. 27, 2015, the entire contents of which are incorporated herein by reference.

TECHNICAL FIELD

The invention relates to an airbag device in which a bag body inflates and deploys to protect an occupant when impact is inputted.

BACKGROUND OF THE INVENTION

An airbag device arranged in front of a passenger's seat of a vehicle has an inflator that generates gas when impact is inputted, and a folded bag body, which are incorporated inside an instrument panel. A breakable deployment wall is provided in an upper part of the instrument panel, and the airbag device is arranged below the deployment wall. In the airbag device, when the inflator generates high-pressure gas at the time of input of impact, the bag body is inflated and deployed by the gas pressure, breaks the deployment wall, and bulges out toward the passenger's seat.

This type of airbag device is installed in a vehicle body with the inflator and bag body held in a metal retainer. The retainer has a bottom wall facing the deployment wall of the instrument panel, and side walls continuous with the bottom wall. Here, the folded bag body is stored inside a recess surrounded by the bottom wall and side walls, while the inflator is installed on the lower surface side of the bottom wall.

Various parts, such as an air-conditioner unit and electric parts, are arranged on the inner side of the instrument panel. Hence, lowering the height of the instrument panel, for example, would bring the inflator of the airbag device closer to the other parts inside the instrument panel. This sets a limitation on the height of the instrument panel and layout of parts inside the instrument panel.

As a countermeasure, airbag devices have been developed in which an inflator is installed on the front or rear, or right or left side wall of a retainer, instead of on the lower surface side of the bottom wall of the retainer, to keep the inflator from bulging out in the height direction (see Japanese Patent Application Publication No. 2012-111389, International Patent Application Publication No. 2010/150603, and International Patent Application Publication No. 2004/045920, for example).

However, when the inflator is installed on the side wall of the retainer, the inflator is arranged on the lateral side of a folded part of the bag body stored inside the recess of the retainer. This makes it difficult to efficiently deploy the bag body toward the deployment wall by high-pressure gas of the inflator when impact is inputted, and requires measures such as an increase in gas pressure of the inflator.

SUMMARY OF THE INVENTION

Against this background, the invention aims to provide an airbag device that can reduce the thickness of the device as a whole, and can efficiently deploy a bag body toward a deployment wall when impact is inputted.

To solve the above problem, an airbag device according to this invention includes: a retainer (e.g. retainer 14 of embodiment) installed on the inner side of a deployment wall (e.g. deployment wall 15 of embodiment) of an instrument panel (e.g. instrument panel 11 of embodiment) that is openable by breaking, and having a bottom wall (e.g. bottom wall 14B of embodiment) arranged opposite to the deployment wall, and a side wall (e.g. front side wall 14F of embodiment) continuous with the bottom wall; a bag body (e.g. bag body 12 of embodiment) folded in a deployable manner, and held in the retainer in the folded state; and an inflator (e.g. inflator 13 of embodiment) installed in the side wall of the retainer, and configured to generate gas to be fed into the bag body when impact is inputted, and all folded parts (e.g. folded parts of main folded portion 12A and short folded portion 12B of embodiment) of the bag body are arranged on a side closer to the deployment wall than an end part of the inflator on a side of the bottom wall of the retainer.

With the above configuration, when gas is injected from the inflator installed in the side wall of the retainer at the time of input of impact, the gas flows toward the folded parts of the bag body arranged on the side close to the deployment wall of the instrument panel. The gas flow at this time is directed toward an appropriate deployment direction of the bag body for opening the deployment wall. Accordingly, by adopting the above configuration, the bag body can be efficiently deployed toward the deployment wall.

The folded bag body may have a main folded portion (e.g. main folded portion 12A of embodiment) and a short folded portion (e.g. short folded portion 12B of embodiment) having a shorter folding length than the main folded portion, the short folded portion may have a base end connected to a gas injector (e.g. gas injector 13b of embodiment) of the inflator, and may be arranged on a side closer to the deployment wall than the main folded portion.

In this case, when gas is injected into the bag body from the inflator at the time of input of impact, the high-pressure gas fills the short folded portion having the short folding length, before filling the main folded portion. Hence, the short folded portion inflates and deploys at an early stage on the side closer to the deployment wall than the main folded portion. Accordingly, the bag body promptly and powerfully pushes up the deployment wall, which allows smooth inflation and deployment of the bag body into the compartment.

All folded parts of the bag body are desirably arranged on a side closer to the deployment wall than the center (e.g. position of center axis C of embodiment) in a direction in which the side wall of the inflator stands up.

In this case, since all of the folded parts of the bag body are brought closer to the deployment wall, the bag body can be more efficiently deployed toward the deployment wall.

The bottom wall of the retainer desirably has a sloped surface (e.g. sloped surface 18 of embodiment) that gradually reduces a depth of the retainer, while separating from the side wall in which the inflator is installed.

In this case, when gas is injected into the inflator at the time of input of impact, the bag body inflating and deploying inside the retainer is given a reaction force directed toward the deployment wall from the sloped surface, so that the entire bag body can be smoothly deployed toward the deployment wall. Hence, the bag body can be more efficiently inflated and deployed toward the deployment wall. Also, since the sloped surface reduces the capacity of the retainer on the bottom wall side, internal pressure of the bag body can be promptly increased when gas is injected from the inflator. Hence, by employing this configuration, the bag body can be inflated and deployed even more smoothly, and the inflator can be downsized.

The retainer may have a pair of the side walls facing each other, and the inflator may be installed in each of the pair of side walls.

In this case, inflation and deployment of the bag body can be accelerated, and weight can be distributed evenly in the retainer.

According to this invention, the inflator is installed in the side wall of the retainer, and all of the folded parts of the bag body are arranged on the side closer to the deployment wall than the end part of the inflator on the side of the bottom wall of the retainer. Hence, the thickness of the device as a whole can be reduced, and the bag body can be efficiently deployed toward the deployment wall when impact is inputted.

DETAILED DESCRIPTION OF THE INVENTION

Figure 1:
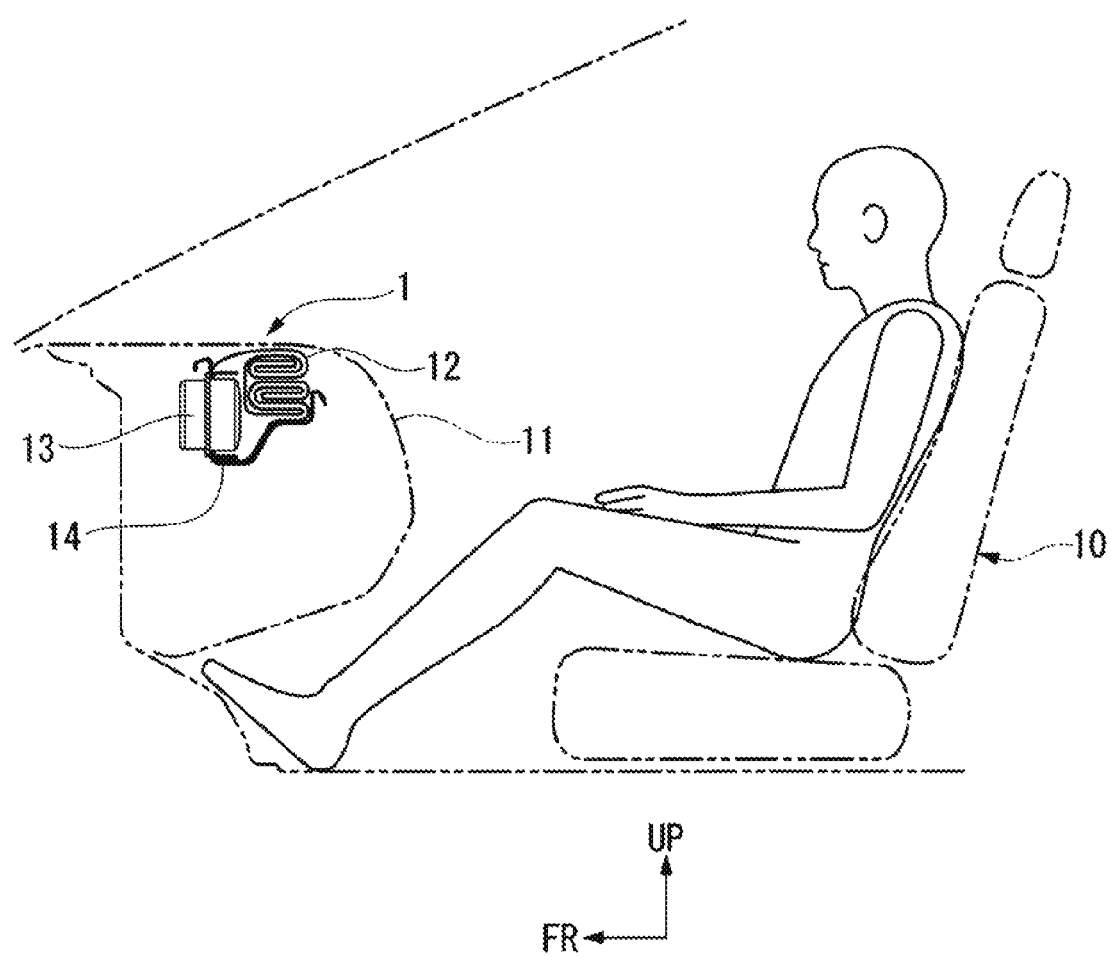
FIG. 1 is a schematic cross-sectional view of a vehicle equipped with an airbag device of a first embodiment of the invention.

Hereinafter, embodiments of the invention will be described with reference to the drawings. Note that in the drawings, arrow FR indicates the front of the vehicle, arrow UP indicates the upper direction of the vehicle, and arrow LH indicates the left side of the vehicle. Also, in the following description, directions such as upper and lower, front and rear, and right and left are the same as those of the vehicle.

First, a first embodiment illustrated in FIGS. 1 to 6 will be described.

FIG. 1 is a schematic cross-sectional view, in which a passenger's seat part of a vehicle and a front area thereof are cut along the longitudinal direction of the vehicle and viewed from the left side.

In FIG. 1, reference numeral 10 indicates a seat on the passenger's side in a vehicle compartment, and reference numeral 11 indicates an instrument panel straddling areas in front of the driver's seat and the passenger's seat. A passenger's seat airbag device 1 is arranged inside a part of the instrument panel 11 in front of the passenger's seat.

Figure 2:
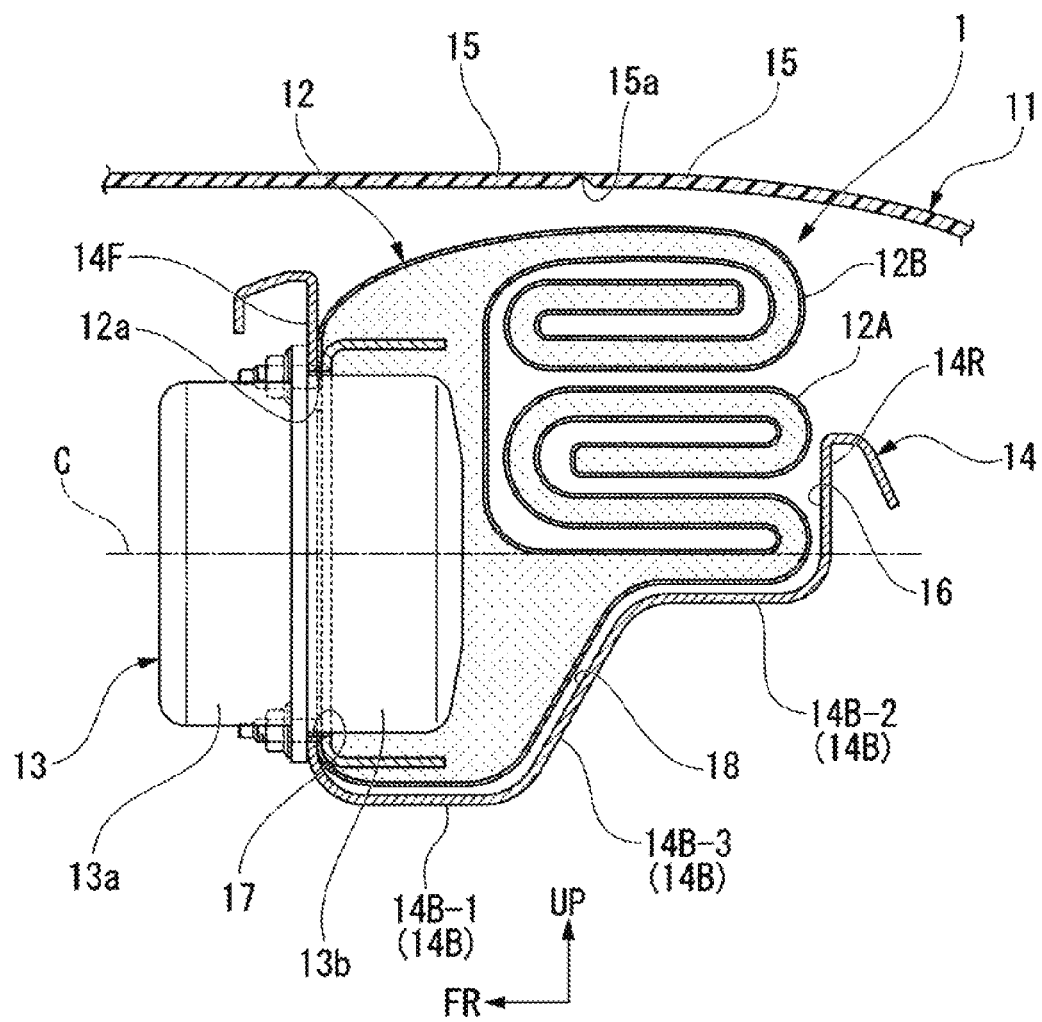
FIG. 2 is a cross-sectional view of the airbag device of the first embodiment of the invention.
Figure 3:
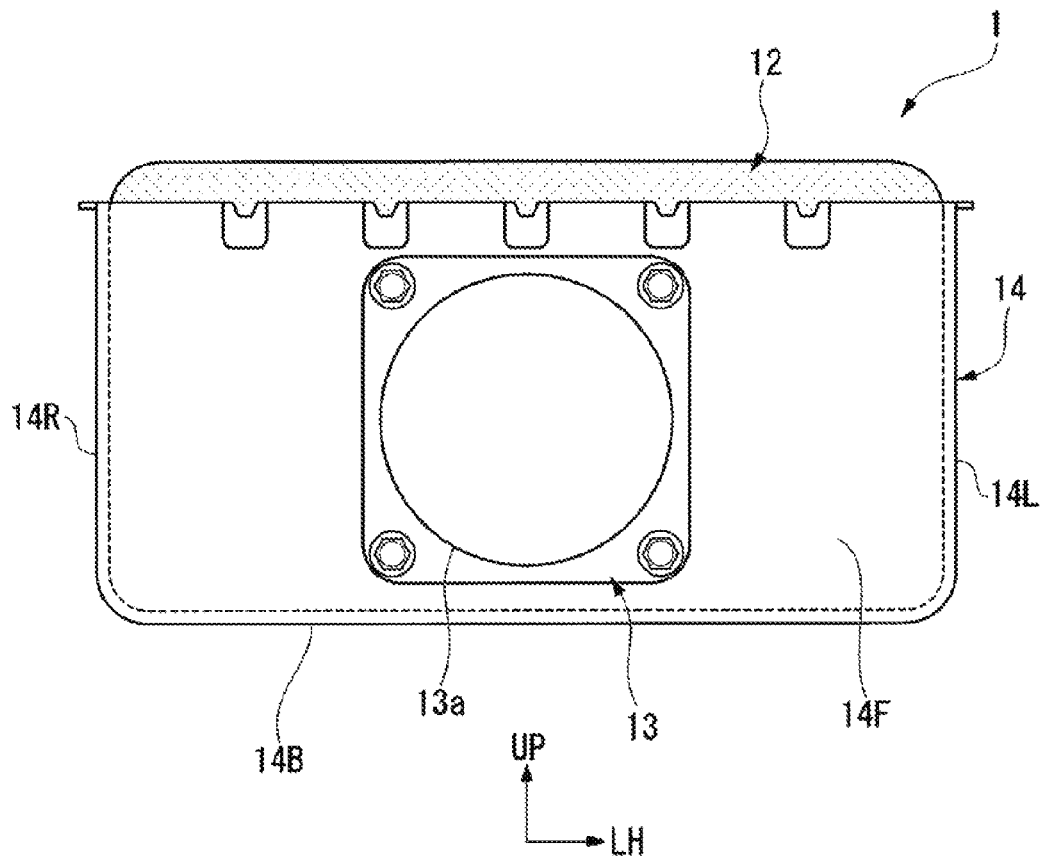
FIG. 3 is a front view of the airbag device of the first embodiment of the invention.

FIG. 2 is a diagram in which the part of the airbag device 1 in FIG. 1 is enlarged, and FIG. 3 is a diagram in which the airbag device 1 is viewed from the vehicle front side.

The airbag device 1 includes a folded bag body 12 that is inflated and deployed by gas pressure, an inflator 13 that generates gas when impact is inputted and feeds high-pressure gas into the bag body 12, and a metal retainer 14 that holds the bag body 12 and the inflator 13. These components are incorporated as an airbag module in a part of the instrument panel 11 in front of the passenger's seat. The airbag device 1 is supported to the vehicle body, by fixing the retainer 14 to a vehicle body member on the inner side of the instrument panel 11. A break guide portion 15a (tear line), which breaks when the bag body 12 of the airbag device 1 inflates and deploys, is provided in an upper wall part of the instrument panel 11 above the airbag device 1. An area of the upper wall part surrounded by the break guide portion 15a constitutes a deployment wall 15, which opens upward like a door when the break guide portion 15a breaks during inflation and deployment of the bag body 12.

The retainer 14 has a bottom wall 14B arranged opposite to and below the deployment wall 15 of the instrument panel 11, left and right side walls 14L, 14R standing up from the periphery of the bottom wall 14B, a front side wall 14F, and a rear side wall 14R. A recess 16, which is surrounded by the bottom wall 14B, side walls 14L, 14R, front side wall 14F, and rear side wall 14R, and opened upward, is formed in the retainer 14. The retainer 14 is formed into a horizontally (vehicle width direction) long substantially rectangular shape in plan view.

The inflator 13 is attached to the front side wall 14F of the retainer 14. The inflator 13 of the embodiment is a so-called disk-type inflator, whose gas generator 13a is formed into a short-axis cylinder, and is attached to the front side wall 14F of the retainer 14 such that its axial direction is oriented substantially in the longitudinal direction of the vehicle body.

Figure 4:
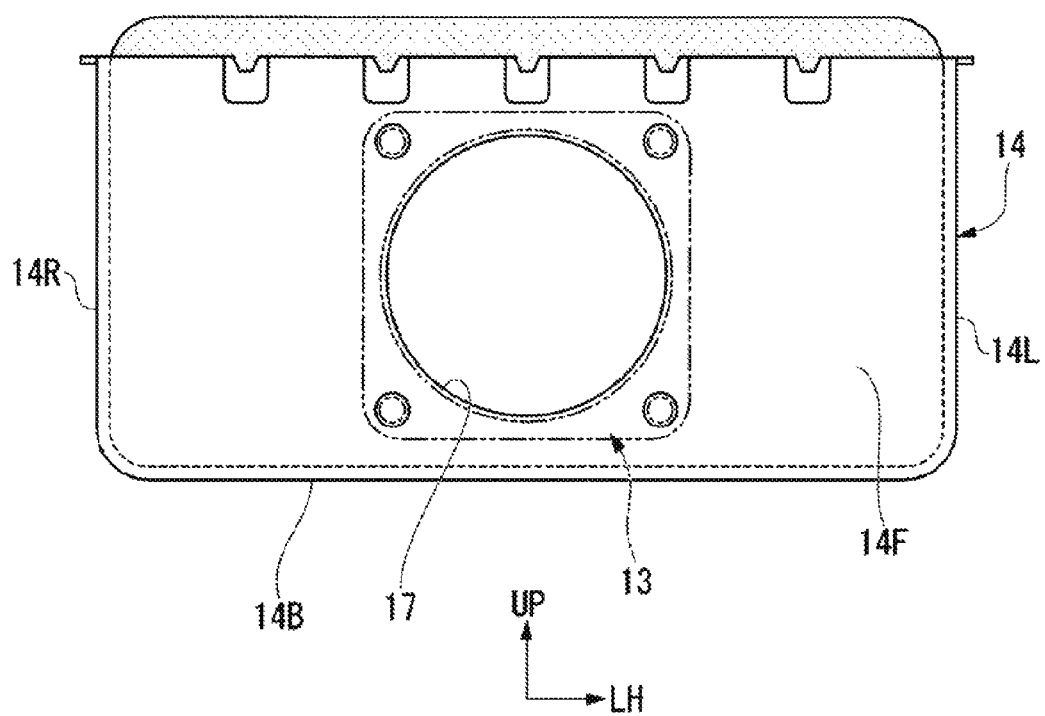
FIG. 4 is a front view of the airbag device of the first embodiment of the invention, from which an inflator is removed.

FIG. 4 is a front view of the retainer 14, from which the inflator 13 is removed.

As shown in FIGS. 2 to 4, a circular insertion hole 17 is formed in the front side wall 14F of the retainer 14. The inflator 13 has a bottomed cylindrical gas injector 13b, which is continuous with an end part in the axial direction of the gas generator 13a. The gas injector 13b of the inflator 13 is inserted into the insertion hole 17 of the retainer 14, from the front side of the front side wall 14F, such that the inflator has two opposite side ends in the extending direction of the front side wall 14F, that is, an upper (first) end part located on a side closest to the instrument panel 11 and an lower (second) end part located on a side closest to the bottom wall 14B of the retainer 14. Unillustrated gas injection holes are formed in an external wall of the gas injector 13b of the inflator 13.

In addition, the bottom wall 14B of the retainer 14 has: a low wall portion 14B-1 that is a part continuous with the lower end of the front side wall 14F; a high wall portion 14B-2 that is a part continuous with the lower end of the rear side wall 14R, and is higher than the low wall portion 14B-1; and a sloped wall portion 14B-3 that connects the low wall portion 14B-1 and the high wall portion 14B-2. An upper surface of the sloped wall portion 14B-3 constitutes a sloped surface 18, which gradually reduces the depth inside the recess 16 of the retainer 14 while separating from the front side wall 14F, such that the entire cross sectional view generally defined by the instrument panel 11 and the retainer 14 looks a tapered shape with the sloped wall portion as shown in FIG. 2. Also, the high wall portion 14B-2 of the retainer 14 is positioned higher than a lower end position of the inflator 13, which is attached to the front side wall 14F.

The retainer 14 of the embodiment is configured such that the lower end part of the rear side wall 14R is set higher than the lower end part of the front side wall 14F, and an upper end part of the rear side wall 14R is set lower than an upper end part of the front side wall 14F. Note that reference sign C in FIG. 2 indicates a center axis of the inflator 13 formed into a short-axis cylinder. In this embodiment, the position of the center axis C of the inflator 13 coincides with the center between the upper (first) end part and the lower (second) end part of the inflator 13 in the direction in which the front side wall 14F (side wall) stands up.

The bag body 12 has a connection port 12a in one part thereof, and the connection port 12a is connected to the gas injector 13b of the inflator 13, on the inner side (rear surface side) of the front side wall 14F of the retainer 14. Also, the bag body 12 is pressed substantially flat in the longitudinal direction, and has an upper edge side area and a residual area, both folded toward the inner side. The upper edge side area and the residual area can be folded in any way, and may be folded in a roll shape, or may be folded in a zigzag shape. The folded part of the upper edge side area has a shorter folding length than the folded part of the residual area. In the embodiment, the folded part of the residual area constitutes a main folded portion 12A, and the folded part of the upper edge side area constitutes a short folded portion 12B. Respective base ends of the main folded portion 12A and short folded portion 12B are connected to the gas injector 13b of the inflator 13.

The bag body 12 is stored in the recess 16 of the retainer 14, with the short folded portion 12B placed on top of the main folded portion 12A. In this state, main folded parts of the main folded portion 12A and short folded portion 12B are positioned in such a manner as to extend from the substantial center inside the recess 16 to an area close to the rear side wall 14R, while avoiding interference with the gas injector 13b of the inflator 13. Additionally, a lower surface of the main folded portion 12A is placed on top of the high wall portion 14B-2 of the bottom wall 14B of the retainer 14.

Thus, in the bag body 12 installed in the folded state in the retainer 14, all folded parts of the main folded portion 12A and short folded portion 12B are arranged on the side (upper side in this embodiment) closer to the deployment wall 15 than the lower (second) end part (end part on side of bottom wall 14B of retainer 14) of the inflator 13. In this embodiment, all of the folded parts of the main folded portion 12A and short folded portion 12B are arranged on the side closer to the deployment wall 15 than the center axis C of the inflator 13.

Figure 5:
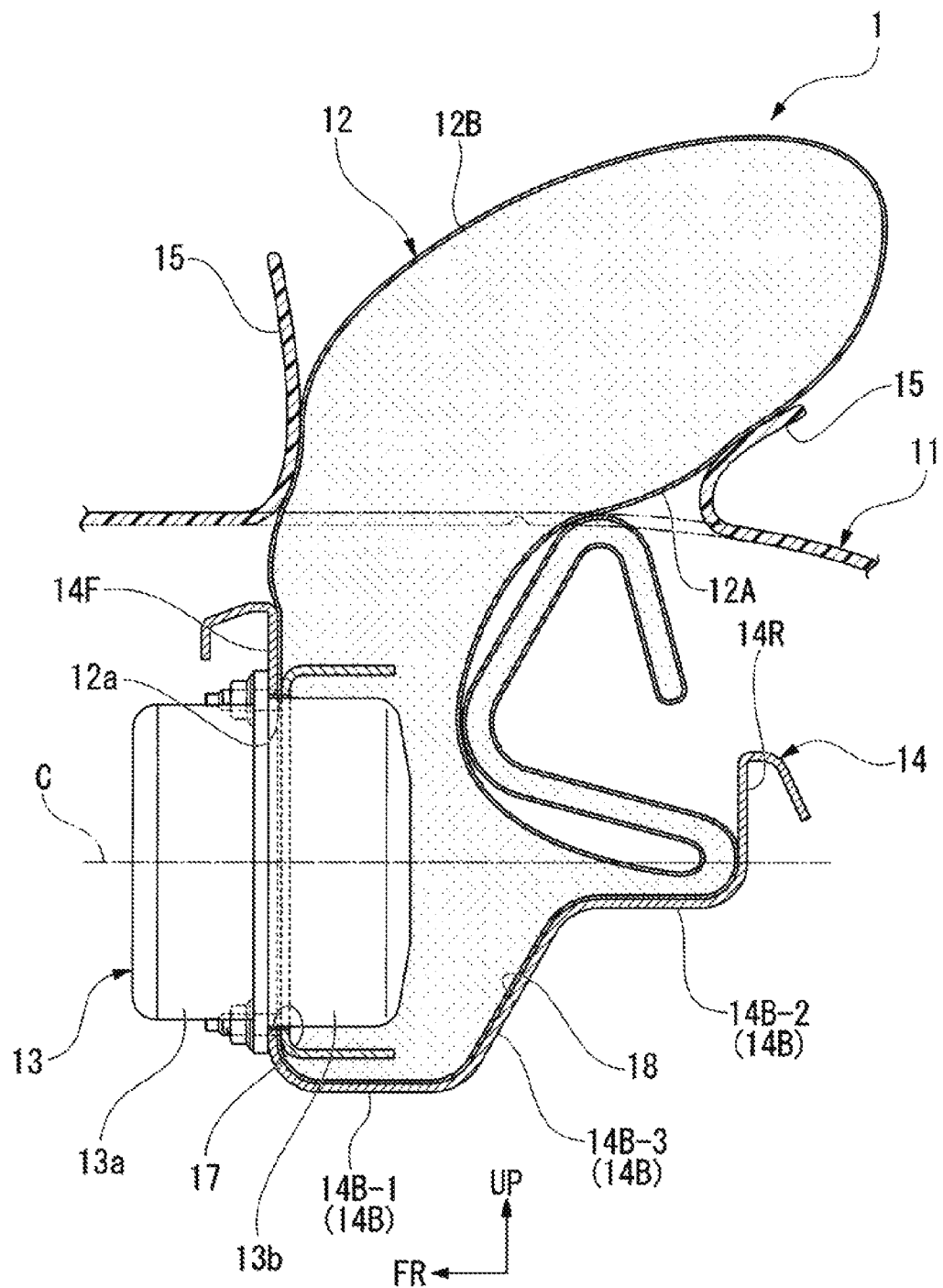
FIG. 5 is a cross-sectional view of the airbag device of the first embodiment of the invention.

FIG. 5 is a diagram showing a cross section similar to that of FIG. 2, in a state where the airbag device 1 is activated.

Hereinafter, an operation of the airbag device 1 will be described with reference to FIGS. 2 and 5.

When a predetermined level or stronger impact is inputted to the vehicle, the inflator 13 of the airbag device 1 generates high-pressure gas, and the gas is introduced into the main folded portion 12A and short folded portion 12B of the bag body 12 through the gas injector 13b. At this time, since the short folded portion 12B is provided above and has a shorter folding length than the main folded portion 12A, its internal pressure increases earlier than that of the main folded portion 12A, and therefore inflates and deploys upward at an early stage. Then, the main folded portion 12A arranged below the short folded portion 12B inflates and deploys upward after the inflation and deployment of the short folded portion 12B.

In the case of this airbag device 1, since all of the folded parts of the main folded portion 12A and short folded portion 12B of the bag body 12 are arranged higher than the lower end (lower end of gas injector 13b) of the inflator 13, the flow of gas flowing toward the main folded portion 12A and short folded portion 12B from the gas injector 13b is directed toward the upper side (deployment wall 15 side). Hence, the gas flow mentioned above prompts rapid inflation and deployment of the main folded portion 12A and short folded portion 12B.

When the short folded portion 12B and main folded portion 12A inflate and deploy upward, they break the break guide portion 15a of the instrument panel 11, and the bag body 12 pushes open the deployment wall 15. Thereafter, when high-pressure gas is continuously fed into the bag body 12, the bag body 12 bulges toward the passenger's seat. As a result, the deployed bag body 12 protects the occupant seated in the passenger's seat.

Figure 6:
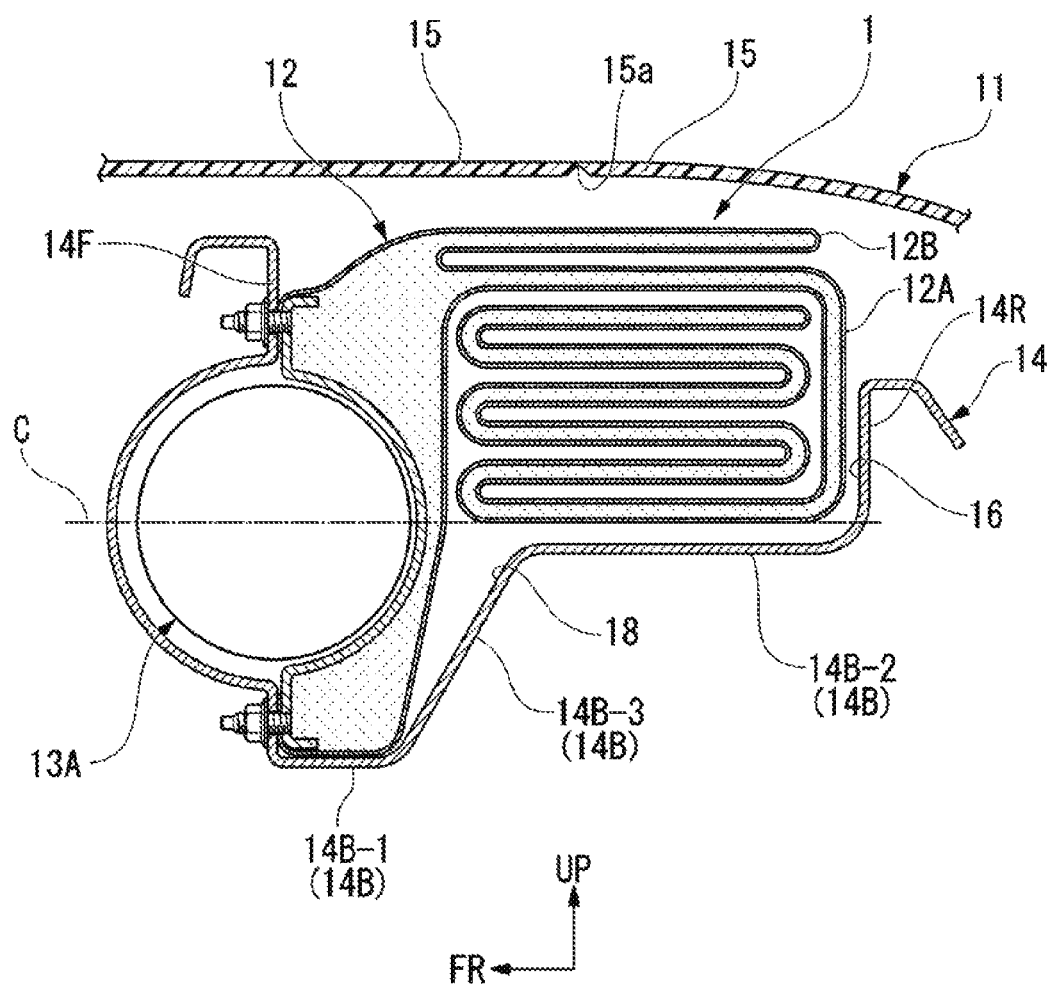
FIG. 6 is a cross-sectional view of an airbag device of a modification of the first embodiment of the invention.

Note that although the so-called disk-type inflator 13 whose gas generator 13a is formed into a short-axis cylinder is attached to the front side wall 14F of the retainer 14 in FIGS. 1 to 5, a so-called cylinder-type inflator 13A, whose gas generator is formed into a long-axis cylinder, may be attached to a front side wall 14F of a retainer 14, as in the modification shown in FIG. 6. In this modification, the inflator 13A is attached to the front side wall 14F of the retainer 14, such that its axial direction is oriented in the vehicle width direction.

In FIG. 6, the same parts as the basic embodiment illustrated in FIGS. 1 to 5 are assigned the same reference numerals.

As has been described, in the airbag device 1 of the embodiment, the inflator 13 is installed in the front side wall 14F of the retainer 14, and all of the folded parts of the bag body 12 are arranged on the side closer to the deployment wall 15 than the (second) end part of the inflator 13 on the side of the bottom wall 14B of the retainer 14. Hence, the vertical thickness of the whole airbag device 1 can be reduced, as compared to installing the inflator 13 below the bottom wall 14B of the retainer 14. Also, gas flowing into the folded parts of the bag body 12 from the inflator 13 can be directed toward an appropriate deployment direction of the bag body 12 for opening the deployment wall 15. Accordingly, by adopting this airbag device 1, the thickness of the device as a whole can be reduced, and the bag body 12 can be efficiently deployed toward the deployment wall 15 when impact is inputted.

Also, in the airbag device 1 of the embodiment, the folded bag body 12 has the main folded portion 12A and the short folded portion 12B having a shorter folding length than the main folded portion 12A, the base end of the short folded portion 12B is connected to the gas injector of the inflator 13, and the short folded portion 12B is arranged above the main folded portion 12A. Hence, when high-pressure gas is injected into the bag body 12 from the inflator 13 at the time of input of impact, the high-pressure gas can fill the upper short folded portion 12B before filling the main folded portion 12A. Accordingly, the short folded portion 12B on the upper side can be inflated rapidly toward the deployment wall 15, to promptly push open the deployment wall 15. Therefore, by adopting this airbag device 1, the bag body 12 can be more promptly and smoothly inflated and deployed into the compartment.

Also, particularly in the airbag device 1 of the embodiment, since all of the folded parts of the bag body 12 are arranged on the upper side (side closer to deployment wall 15) of the position of the center axis C of the inflator 13, gas flowing into the folded parts of the bag body 12 from the inflator 13 is directed toward the direction headed for the deployment wall 15 from the retainer 14. Hence, the bag body 12 can be more efficiently deployed toward the deployment wall 15.

Furthermore, the airbag device 1 of the embodiment has, on the bottom wall 14B of the retainer 14, the sloped surface 18 that gradually reduces the depth of the retainer 14 while separating toward the rear from the front side wall 14F. For this reason, when high-pressure gas is injected into the bag body 12 from the inflator 13, the bag body 12 inflating and deploying inside the retainer 14 is effectively given a reaction force directed toward the deployment wall 15, from the sloped surface 18. Accordingly, by adopting this configuration, the bag body 12 can be shifted smoothly toward the deployment wall 15, and can be inflated and deployed more efficiently.

Also, in the airbag device 1 of the embodiment, forming the sloped surface 18 in the bottom wall 14B of the retainer 14 reduces the capacity of the retainer 14 on the bottom wall 14B side. Hence, internal pressure of the bag body 12 can be promptly increased when gas is injected from the inflator 13, whereby the bag body 12 can be inflated and deployed even more smoothly. Additionally, since the bag body 12 can be efficiently inflated and deployed with less gas, the inflator 13 can be downsized.

Next, a description will be given of a second embodiment illustrated in FIG. 7. Note that in the second embodiment, parts in common with the first embodiment are assigned the same reference numerals, and overlapping description will be omitted.

Figure 7:
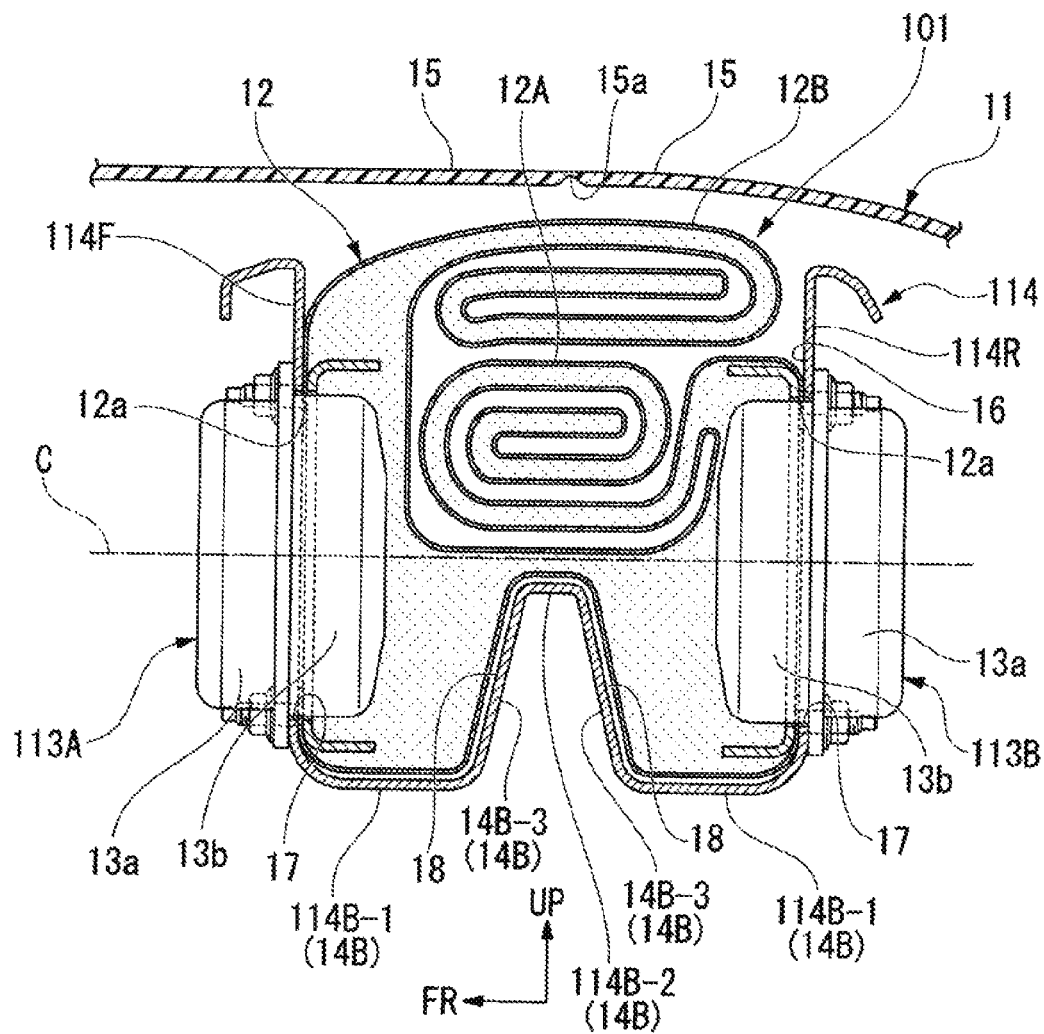
FIG. 7 is a cross-sectional view of an airbag device of a second embodiment of the invention.

FIG. 7 is a diagram showing a cross section, which is similar to that of the first embodiment in FIG. 2, of an airbag device 101 of the second embodiment.

The airbag device 101 of the second embodiment is largely different from the first embodiment in that it has two inflators 113A, 113B for feeding high-pressure gas into a bag body 12, and the inflators 113A, 113B are respectively attached to a front side wall 114F and a rear side wall 114R of a retainer 114.

Also, a bottom wall 114B of the retainer 114 has: low wall portions 114B-1 continuous with the respective lower ends of the front side wall 114F and rear side wall 114R; and a high wall portion 114B-2 arranged at the substantial center between the low wall portions 114B-1 on both front and rear sides. Additionally, each of the front and rear low wall portions 114B-1 is connected to the high wall portion 114B-2 at the center, through a sloped wall portion 114B-3. An upper surface of each sloped wall portion 114B-3 is formed into a sloped surface 18.

In addition, the bag body 12 has two connection ports 12a respectively connected to gas injectors 13b of the inflators 113A, 113B on the front side wall 114F side and rear side wall 114R side. The bag body 12 is folded and stored inside a recess 16 of the retainer 114 as in the case of the first embodiment, but a main folded portion 12A and a short folded portion 12B arranged thereabove are positioned at the substantial center in the longitudinal direction of the retainer 114. All folded parts of the main folded portion 12A and short folded portion 12B are arranged on the upper side (side closer to deployment wall 15) of respective lower (second) end parts of the two inflators 113A, 113B. Also, all of the folded parts of the main folded portion 12A and short folded portion 12B are arranged above a center axis C of the inflators 113A, 113B.

In the airbag device 101, high-pressure gas is injected into the bag body 12 from the front and rear two inflators 113A, 113B, when impact is inputted. The bag body 12 receives gas pressure from the two inflators 113A, 113B, and inflates and deploys its short folded portion 12B and main folded portion 12A, as in the case of the first embodiment.

Although the airbag device 101 of the second embodiment differs from the first embodiment in that it has two inflators 113A, 113B, the rest of the configuration is substantially the same. Hence, the airbag device 101 can achieve effects similar to those of the first embodiment.

Note, however, that in the airbag device 101 of the second embodiment, the inflators 113A, 113B are respectively installed in the front side wall 114F and rear side wall 114R, which face each other in the retainer 114. This can hasten the inflation and deployment of the bag body 12, and can even out weight distribution in the longitudinal direction of the retainer 114.

Note that the invention is not limited to the above embodiments, and various design changes can be made without departing from the gist of the invention. For example, although the inflator is installed in the front side wall and rear side wall of the retainer in the above embodiments, the inflator may be installed in at least one of the right and left side walls of the retainer.

DESCRIPTION OF REFERENCE NUMERALS 1, 101 . . . airbag device
11 . . . instrument panel
12 . . . bag body
12A . . . main folded portion (folded part)
12B . . . short folded portion (folded part)
13, 13A, 113A, 113B . . . inflator
13b . . . gas injector
14, 114 . . . retainer
14B, 114B . . . bottom wall
14F . . . front side wall (side wall)
15 . . . deployment wall
18 . . . sloped surface

The invention claimed is:

1. An airbag device comprising:
a retainer installed on an inner side of a deployment wall of an instrument panel that is disposed in front of a passenger's seat and openable by breaking, the retainer having a side wall and a bottom wall which is arranged on a side opposite to said deployment wall with respect to the side wall, the side wall extending from the bottom wall toward the instrument panel;
a bag body having folded parts held by said retainer in a folded state and in a deployable manner on the inner side of the instrument panel; and
at least one inflator installed in said side wall of said retainer such that the at least one inflator has a first end part located on a side of said deployment wall and a second end part located on a side of the bottom wall of the retainer, and configured to generate gas to be fed into said bag body when impact is inputted, wherein
all of the folded parts of said bag body are arranged on a side closer to said deployment wall than the second end part of said at least one inflator, and
said bag body and said at least one inflator are disposed side by side in a direction along which the deployment wall extends.

2. The airbag device according to claim 1, wherein
said folded parts of the bag body comprise a main folded portion and a short folded portion which has a shorter folding length than the main folded portion; and
said short folded portion has a base end connected to a gas injector of said at least one inflator and is arranged on a side closer to said deployment wall than said main folded portion.

3. The airbag device according to claim 1, wherein
all of the folded parts of said bag body are arranged on a side closer to said deployment wall than a center between the first end part and the second end part in a direction in which said side wall of said at least one inflator extends.

4. The airbag device according to claim 1, wherein
said bottom wall of said retainer has a sloped surface extending to a position away from said at least one inflator in a manner that gradually becomes closer to said deployment wall, thereby reducing a depth of said retainer from said deployment wall.

5. The airbag device according to claim 1, wherein
said retainer has a pair of said side walls facing each other, and
said at least one inflator comprising two inflators is installed in each of the pair of said side walls.

* * * * *